United States Patent
Griffin et al.

(10) Patent No.: US 8,670,709 B2
(45) Date of Patent: Mar. 11, 2014

(54) NEAR-FIELD COMMUNICATION (NFC) SYSTEM PROVIDING MOBILE WIRELESS COMMUNICATIONS DEVICE OPERATIONS BASED UPON TIMING AND SEQUENCE OF NFC SENSOR COMMUNICATION AND RELATED METHODS

(75) Inventors: Jason T. Griffin, Kitchener (CA); Steven Henry Fyke, Waterloo (CA); Christopher Lyle Bender, Tavistock (CA); Santiago Carbonell Duque, Waterloo (CA); David Ryan Walker, Waterloo (CA); Jerome Pasquero, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 668 days.

(21) Appl. No.: 12/713,628

(22) Filed: Feb. 26, 2010

(65) Prior Publication Data

US 2011/0212688 A1 Sep. 1, 2011

(51) Int. Cl.
*H04B 5/00* (2006.01)

(52) U.S. Cl.
USPC ...... 455/41.1; 455/41.2; 455/410; 455/414.1; 455/575; 455/557; 455/556.2; 455/411; 370/302; 370/295; 370/343; 713/65; 713/185

(58) Field of Classification Search
USPC ......... 455/41.1, 41.2, 410, 411, 414.1, 556.2, 455/90.3, 575, 557; 713/65, 185; 370/302, 370/295, 343, 480
See application file for complete search history.

(56) References Cited

U.S. PATENT DOCUMENTS

| | | | | |
|---|---|---|---|---|
| 7,427,926 | B2 * | 9/2008 | Sinclair et al. | 340/4.2 |
| 7,590,384 | B2 * | 9/2009 | Dawidowsky | 455/41.1 |
| 7,647,024 | B2 * | 1/2010 | Wang et al. | 455/41.2 |
| 7,653,397 | B2 * | 1/2010 | Pernu et al. | 455/450 |
| 7,688,208 | B2 * | 3/2010 | Schuler et al. | 340/572.1 |
| 7,899,492 | B2 * | 3/2011 | Wang et al. | 455/556.1 |

(Continued)

FOREIGN PATENT DOCUMENTS

| | | |
|---|---|---|
| EP | 2131313 | 12/2009 |
| WO | 2006/095186 | 9/2006 |

(Continued)

OTHER PUBLICATIONS

Jenq-Muh Hsu et al: "*Design a Virtual Object Representing Human-Machine Interaction for Music Playback Control in Smart Home*", Complex, Intelligent And Software Intensive Systems, 2009. CISIS '09. International Conference On, IEEE, Piscataway, NJ, USA, Mar. 16, 2009, pp. 614-619.

(Continued)

*Primary Examiner* — Marceau Milord
(74) *Attorney, Agent, or Firm* — Allen, Dyer, Doppelt, Milbrath & Gilchrist, P.A.

(57) ABSTRACT

A near-field communication (NFC) system may include a plurality of spaced-apart NFC sensors and at least one mobile wireless communications device. The at least one mobile wireless communications device may include a portable housing, an NFC circuit carried by the portable housing and configured to establish NFC communications with the NFC sensors when moved in close proximity therewith, and a controller carried by the portable housing and coupled to the NFC circuit. The controller may be configured to perform different mobile device operations based upon a timing and sequence in which the NFC sensors are communicated with.

31 Claims, 9 Drawing Sheets

(56) References Cited

U.S. PATENT DOCUMENTS

| | | | |
|---|---|---|---|
| 7,907,954 B2 * | 3/2011 | Poyhonen et al. | 455/454 |
| 7,924,158 B2 * | 4/2011 | Schuler et al. | 340/572.1 |
| 7,948,925 B2 * | 5/2011 | Miyabayashi et al. | 370/302 |
| 7,952,512 B1 * | 5/2011 | Delker et al. | 342/42 |
| 7,957,733 B2 * | 6/2011 | Wang et al. | 455/426.2 |
| 7,986,917 B2 * | 7/2011 | Ahlgren et al. | 455/41.2 |
| 8,233,937 B2 * | 7/2012 | Ueda et al. | 455/552.1 |
| 8,235,293 B2 * | 8/2012 | Yu et al. | 235/462.13 |
| 8,244,179 B2 * | 8/2012 | Dua | 455/41.2 |
| 8,400,530 B2 * | 3/2013 | Ikeda et al. | 348/231.99 |
| 2005/0077356 A1 | 4/2005 | Takayama et al. | 235/451 |
| 2006/0178110 A1 | 8/2006 | Nurminen et al. | 455/141.2 |
| 2007/0037614 A1 | 2/2007 | Rosenberg | 455/575.1 |
| 2008/0014989 A1 | 1/2008 | Sandegard et al. | 455/577 |
| 2008/0160984 A1 | 7/2008 | Benes et al. | 455/419 |
| 2008/0195735 A1 | 8/2008 | Hodges et al. | |
| 2009/0011706 A1 | 1/2009 | Wilson et al. | 455/41.1 |
| 2009/0051648 A1 | 2/2009 | Shamaie et al. | 345/156 |
| 2009/0096580 A1 | 4/2009 | Paananen | 340/10.1 |
| 2009/0131151 A1 | 5/2009 | Harris et al. | |
| 2009/0143141 A1 | 6/2009 | Wells et al. | |
| 2009/0291634 A1 * | 11/2009 | Saarisalo | 455/41.1 |
| 2009/0320123 A1 | 12/2009 | Yu et al. | 726/16 |
| 2011/0070827 A1 * | 3/2011 | Griffin et al. | 455/41.1 |
| 2011/0070828 A1 * | 3/2011 | Griffin et al. | 455/41.1 |

FOREIGN PATENT DOCUMENTS

| | | |
|---|---|---|
| WO | 2008-069577 | 6/2008 |
| WO | 2008/087431 | 7/2008 |
| WO | 2009/013510 | 1/2009 |
| WO | 2009/061618 | 5/2009 |
| WO | 2009/147548 | 12/2009 |

OTHER PUBLICATIONS

Pering et al. "Gesture-Connect-Facilitating-Tangible-Interaction-With-A-Flick-Of-The-Wrist" http://www.docstoc.com/docs/17904949/Gesture-Connect-Facilitating-Tangible-Interaction-With-a-Flick-Of- Printed Jun. 19, 2013.

Pirttikangas et al. "Comparison of Touch, Mobile Phone, and Gesture Based Controlling of Browser Applications on a Large Screen" http://www.pervasive2008.org/Papers/LBR/lbr2.pdf: Printed Jun. 19, 2013.

Vatsala Nundloll-Ramdhany "Multi-Tag Interaction: Physical Mobile Interactions With Multiple Tags" http://www.lancs.ac.uk/postgrad/nundloll/MultiTag.pdf: Printed Jun. 19, 2013.

* cited by examiner

NEAR-FIELD COMMUNICATION (NFC) SYSTEM PROVIDING MOBILE WIRELESS COMMUNICATIONS DEVICE OPERATIONS BASED UPON TIMING AND SEQUENCE OF NFC SENSOR COMMUNICATION AND RELATED METHODS

TECHNICAL FIELD

This application relates to the field of communications, and more particularly, to mobile wireless communications devices and related methods that use near-field communication (NFC).

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters.

With NFC technology becoming more widely adopted, it is now used with portable wireless communications devices in association with other short-range wireless communications, such as a wireless Bluetooth connection. For example, an NFC connection is often used to establish a wireless Bluetooth connection in which data for establishing the Bluetooth connection is communicated.

DETAILED DESCRIPTION

Figure 1:
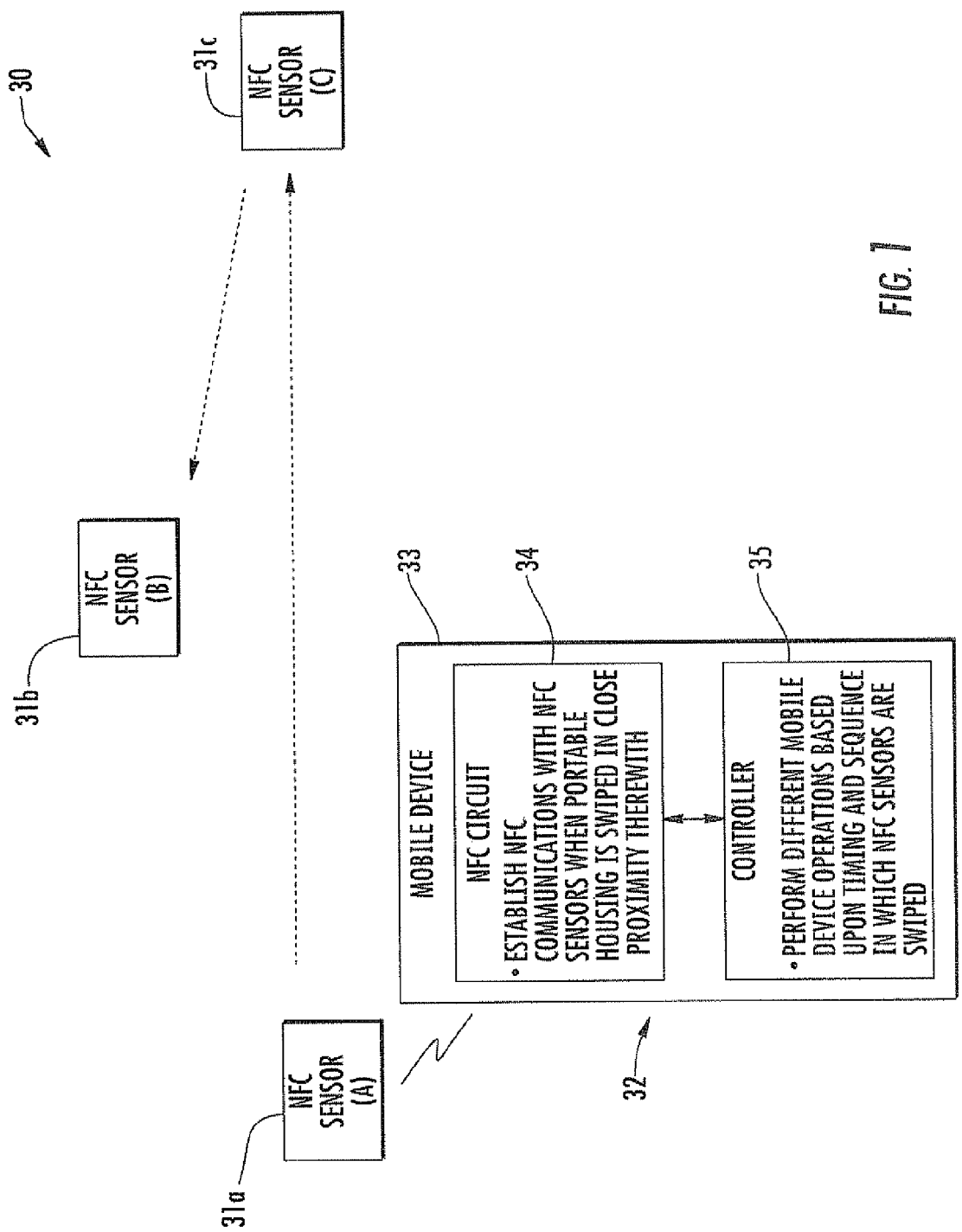
FIG. 1 is a schematic block diagram of a near field communication (NFC) system in accordance with an exemplary embodiment.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a near-field communication (NFC) system is disclosed herein which may include a plurality of spaced-apart NFC sensors and at least one mobile wireless communications device. The at least one mobile wireless communications device may include a portable housing, an NFC circuit carried by the portable housing and configured to establish NFC communications with the NFC sensors when moved in close proximity therewith, and a first controller carried by the portable housing and coupled to the NFC circuit. The first controller may be configured to perform different mobile device operations based upon a timing and sequence in which the NFC sensors communicate. As such, the mobile wireless communications device may advantageously be used to relatively quickly and conveniently initiate different mobile device operations by changing the timing or sequence of the NFC sensors that are communicated with.

More particularly, in accordance with one example the different mobile device operations may comprise different audio playback operations. By way of example, the first controller may be configured to move forward or backward through an audio track based upon different (e.g., respective forward or reverse) movement sequences relative to the NFC sensors. Similarly, the first controller may be configured to skip forward or backward to a next or previous audio track based upon different (e.g., respective forward or reverse) movement sequences relative to the NFC sensors. The different audio playback operations may also include raising and lowering a volume of audio playback.

In accordance with another example, the different mobile device operations may comprise device locking and unlocking operations. That is, the timing and sequence of NFC sensor communication may act as a password for unlocking the at least one mobile wireless communications device, as well as a locking sequence for locking the at least one mobile wireless communications device from unauthorized use. Additionally, the at least one mobile wireless communications device may further comprise a wireless transceiver coupled to the first controller. As such, the different mobile device operations may comprise initiating and discontinuing communications via the wireless transceiver circuit.

The NFC system may further include a second controller coupled to the plurality of spaced-apart NFC sensors and configured to perform a plurality of different remote operations also based upon the timing and sequence in which the NFC sensors are communicated with. By way of example, the different remote operations may comprise different audio playback operations. In some embodiments, the NFC system may further include a substrate carrying the plurality of spaced-apart NFC sensors, such as an article of clothing, for example. Furthermore, the at least one mobile wireless communications device may comprise a plurality thereof configured to perform the different mobile device operations based upon both housings being moved in respective sequences.

A similar NFC system may include a plurality of spaced-apart NFC sensors, and at least one mobile wireless communications device comprising a portable housing and an NFC circuit carried by the portable housing and configured to establish NFC communications with the NFC sensors when the portable housing is moved in close proximity therewith. The system may further include a controller coupled to the plurality of spaced-apart NFC sensors and configured to perform a plurality of different remote operations based upon a timing and sequence in which the NFC sensors are communicated with.

A related mobile wireless communications device, such as the one described briefly above, and NFC method are also provided. The method may be for use with a plurality of spaced-apart NFC sensors and at least one mobile wireless communications device comprising a portable housing and an NFC circuit carried by the portable housing. The method may include establishing NFC communications between the NFC circuit and the NFC sensors when the portable housing is moved in close proximity therewith, and performing different mobile device operations based upon a timing and sequence in which the NFC sensors are communicated with.

Figure 8:
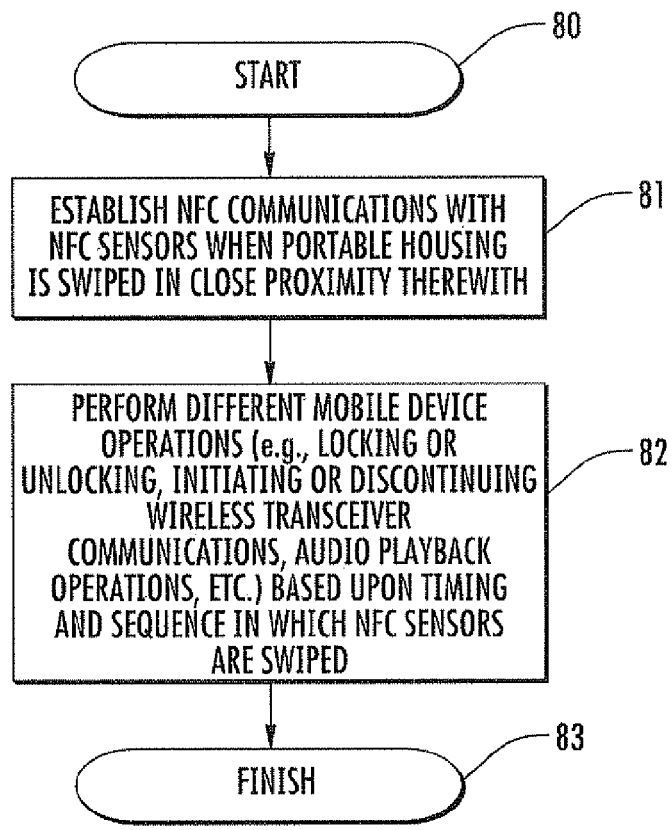
FIG. 8 is a flow diagram illustrating method aspects associated with the NFC system of FIG. 1.

Referring initially to FIGS. 1 and 8, an NFC system 30 illustratively includes a plurality of spaced-apart NFC sensors 31a-31c and a mobile wireless communications device 32 (also referred to as a "mobile device" herein). NFC is a short range variant of radio-frequency identification (RFID), typically operating at approximately 13.56 MHz. NFC technology allows a wireless connection to be established between a mobile device that has an embedded NFC chipset and an ISO 14443 reader terminal at a range of up to about 20 cm, so that the devices are "swiped" or otherwise moved in close proximity to communicate. NFC is a standardized technology that may be used in various applications such as mobile banking, ticketing, secure physical access, etc. The mobile device 32 may further include additional wireless capabilities beyond NFC in some embodiments, as will be discussed further below, but this is not required in all embodiments. The NFC sensors 31a-31c may be passive tags or active readers depending upon the given implementation, as will be discussed further below. While three NFC sensors 31a-31c are shown in the present example, other numbers of sensors may be used in different embodiments.

The mobile wireless communications device 32 illustratively includes a portable housing 33, and an NFC circuit 34 carried by the portable housing and configured to establish NFC communications with the NFC sensors 31a-31c when the portable housing is moved in close proximity therewith, at Blocks 80-81. The mobile device 32 further illustratively includes a controller 35 carried by the portable housing 33 and coupled to the NFC circuit 34. The controller 35 is configured to perform different mobile device operations based upon a timing and sequence in which the NFC sensors are communicated with, at Block 82, which concludes the method illustrated in FIG. 8 (Block 83). Example mobile devices may include portable or personal media players (e.g., MP3 players, video players, etc.), remote controls (e.g., television or stereo remotes, etc.), portable gaming devices, portable or mobile telephones, smartphones, etc.

In the example of FIG. 1, the sequence in which the mobile device 32 is moved is from sensor 31a to sensor 31b, then from sensor 31c to sensor 31b (i.e., from point A to C to B), as indicated by the dashed arrows. By way of example, this (or other) sequences and timing of movement may be used to initiate mobile device operations such as audio playback operations, device locking or unlocking, initiating or discontinuing wireless transceiver communications, etc., as will be discussed further below. As such, the mobile device 32 may advantageously be used to relatively quickly and conveniently initiate different mobile device operations by changing the timing or sequence in which the NFC sensors 31a-31c are communicated with.

Figure 2:
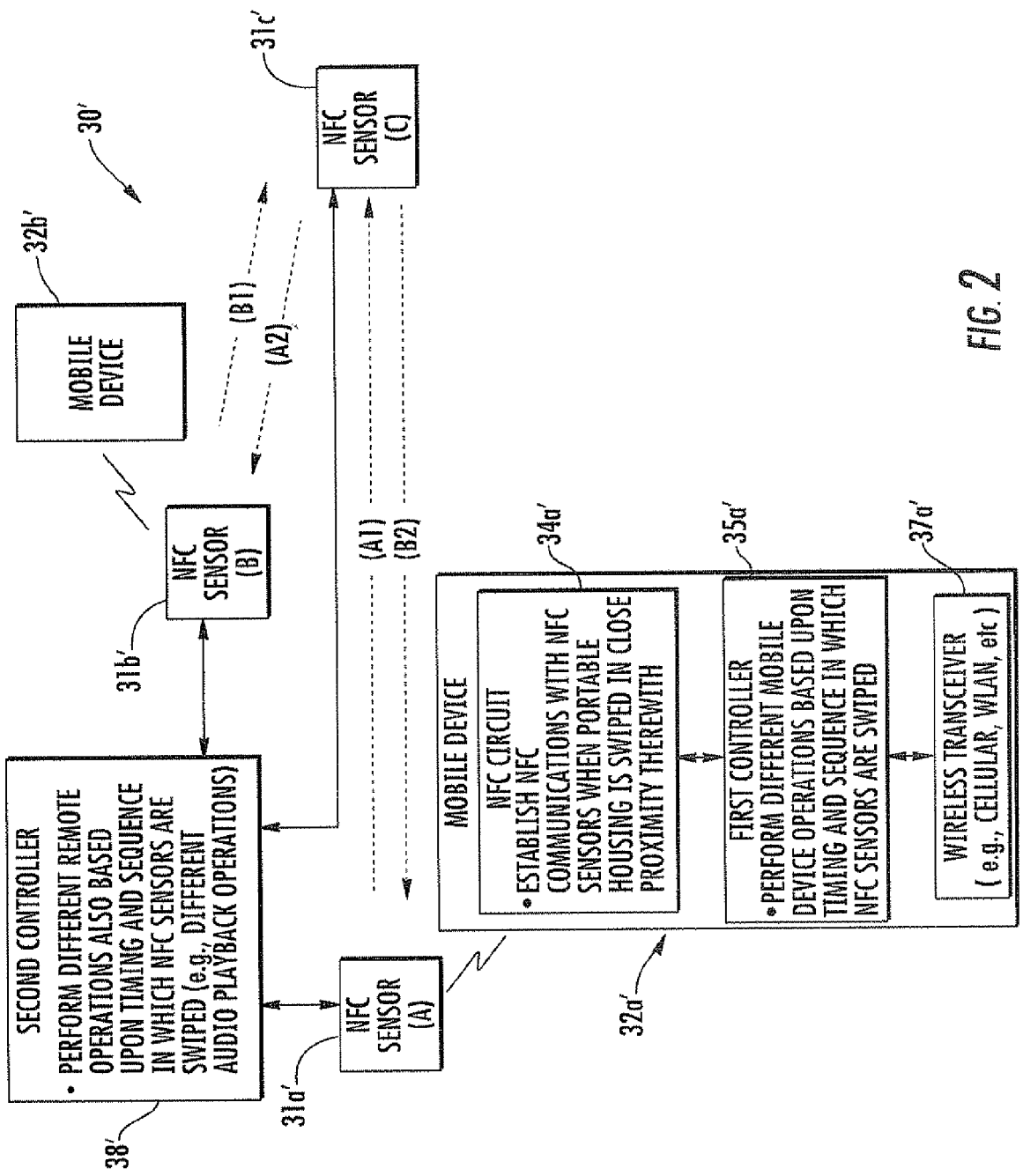
FIG. 2 is a schematic block diagram of an alternative embodiment of the NFC system of FIG. 1.
Figure 3:
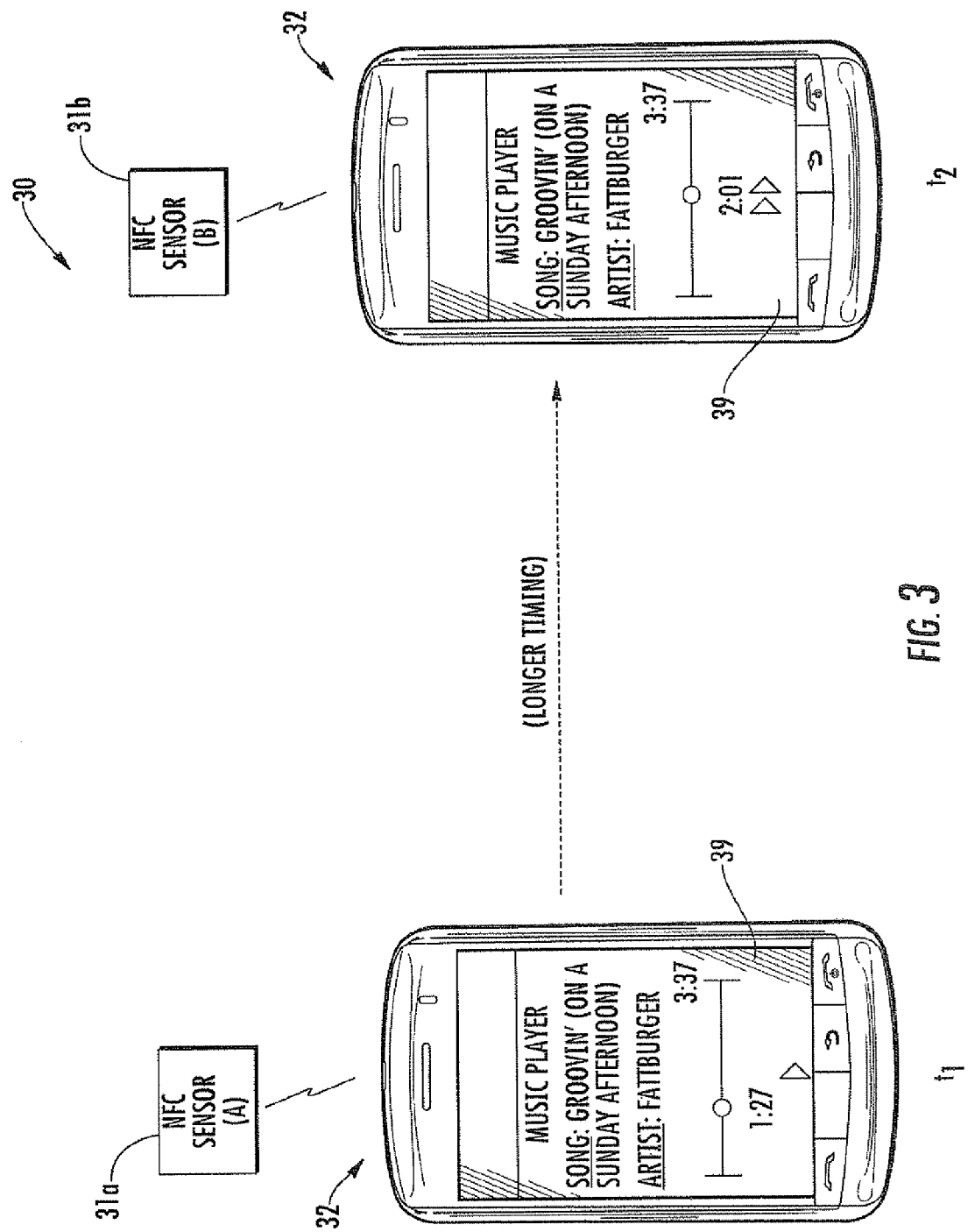
FIGS. 3 through 6 are a series of schematic block diagrams illustrating NFC sensor communication sequences and corresponding mobile device operations for the system of FIG. 1.
Figure 4:
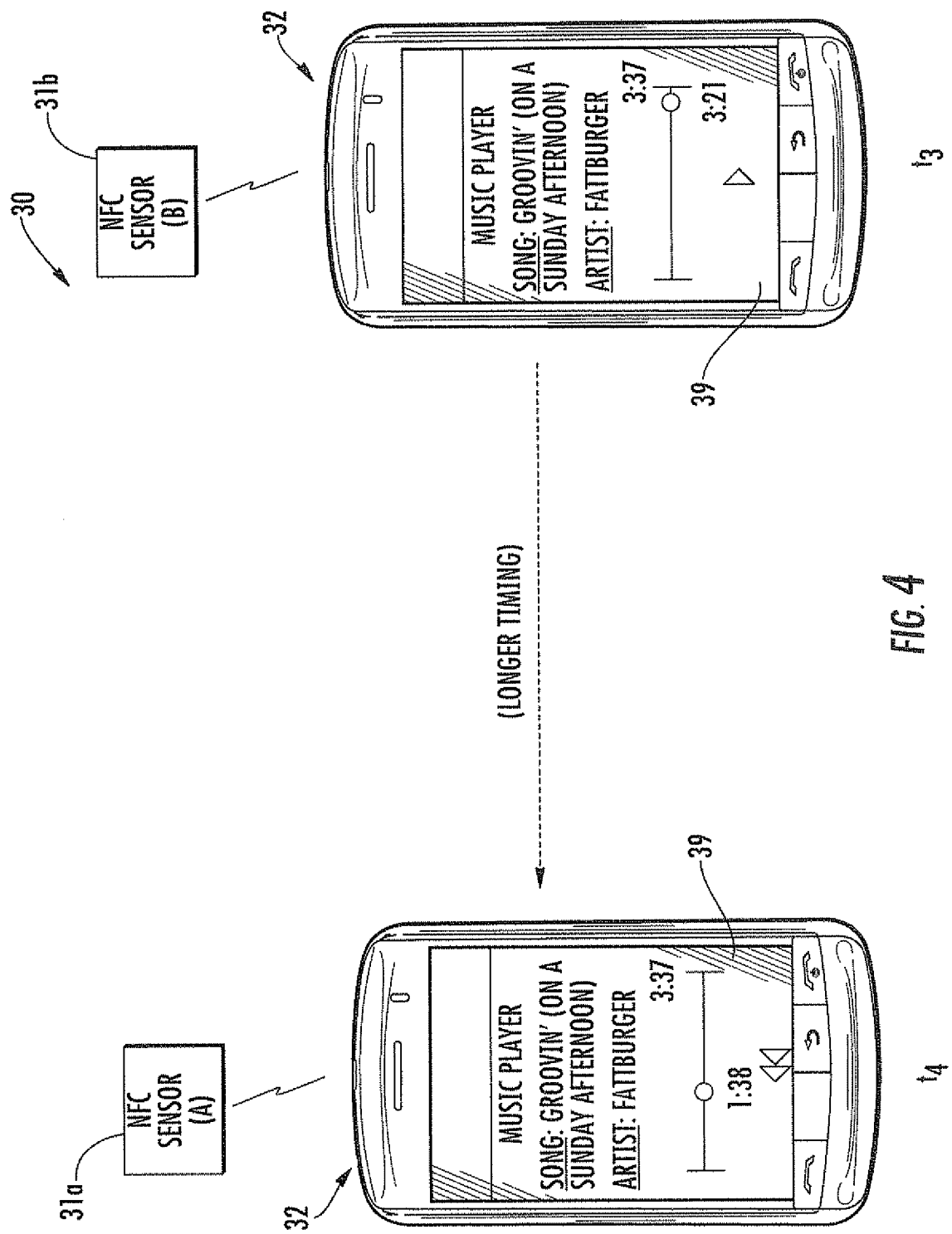

Turning additionally to FIG. 2, an example in which two mobile devices 32a', 32b' are moved in respective sequences is shown. In some applications, different mobile device operations may be performed based upon both mobile devices 32a', 32b' being moved in respective sequences. The first mobile device 32a' further illustratively includes a wireless transceiver 37a' coupled to a first controller 35a'. The wireless transceiver 37a' may comprise a cellular transceiver, although other suitable wireless communications formats, such as wireless LAN (e.g., 802.11x, Bluetooth), WiMAX, etc., may also be used, for example. In the present embodiment, the first mobile device 32a' is moved from the NFC sensor 31a' to sensor 31c' (arrow A1) to sensor 31b' (arrow A2) (i.e., from point A to B to C), while the mobile device 32b' is moved in an opposite sequential order (i.e., from point B to C to A, as indicated by arrows B1 and B2).

The system 30' further illustratively includes a second controller 38' coupled to the NFC sensors 31a'-31c'. The second controller 38' is similarly configured to perform different remote operations (i.e., operations performed off board the mobile devices 32a', 32b') also based upon the timing and sequence in which the NFC sensors 31a'-31c' are communicated with. The remote operations may be in addition to, or in combination with, the operations performed by (i.e., on board) the mobile devices 32a', 32b'. One exemplary operation is that moving one or both of the mobile devices 32a', 32b' in predetermined sequences may cause the second controller 38' to initiate wireless communications with the wireless transceiver 37a', such as for Bluetooth communications. Movement in a different sequence, or at a different speed, for example, may then terminate the wireless (e.g., Bluetooth) communications or disable the wireless transceiver 37a' altogether.

More particularly, in one exemplary embodiments the NFC sensors 31a'-31c' may be positioned within an automobile, such as on a dashboard thereof. The mobile device 32a' may be moved in the appropriate sequence and timing to initiate a Bluetooth link with the automobile (e.g., upon entering the automobile), and similarly may be moved in a different sequence with the appropriate timing to discontinue the Bluetooth link (e.g., upon exiting the automobile). Continuing with the same example, one or both of the mobile devices 32a', 32b' may be used to control the audio playback operations (e.g., play, skip, rewind, fast forward, volume up or down, etc.). Audio playback operation control will be discussed further below with reference to FIGS. 3-6.

In another exemplary implementation, the second controller 38' may serve as a security system controller. For example, the second controller 38' may be used to lock or unlock a door, enable or disable one or more components of a security system, etc. Thus, moving one or both of the mobile devices 32a', 32b' in the appropriate sequence and with the appropriate timing will serve as a password or combination to cause the second controller 38' to unlock or lock a door, arm or disarm security system components, etc.

It should be noted that in such embodiments an NFC circuit may be used by itself (e.g., a passive NFC circuit carried on a key card, key chain, jewelry, or other substrate), rather than as part of a mobile device. Moreover, it should also be noted that the second controller 38' need not always be linked to the NFC sensors 31a'-31c' as shown in FIG. 2. An example includes controlling a car stereo via Bluetooth where the vehicle was not originally equipped with NFC capabilities. Passive NFC tags may be added to the interior of the vehicle as an aftermarket product that do not communicate with the car or stereo. In such instances, one or both of the mobile devices 32a', 32b' may be set up to recognize the passive tags in a gesture sequence (e.g., using a software application running on the mobile device), and then connect and control the stereo via its Bluetooth connection.

In such instances where the second controller 38' is not linked to the NFC sensors 31a'-31c' (such as the Bluetooth stereo example described above), the first controller 35a' may track the sequence and timing in which the NFC sensors are communicated with. The first controller 35a' may then cause the wireless transceiver 37a' to relay this information (or corresponding remote commands) to the second controller 38' to initiate the appropriate actions based thereon.

In accordance with another example, the different mobile device operations may comprise device locking and unlocking operations. That is, the timing and sequence of NFC sensor 31a'-31c' communication may act as a password or combination for unlocking one or both of the mobile devices 32a', 32b', as well as a locking sequence for locking one or both of the mobile devices from unauthorized use.

Turning now to FIGS. 3-6, an exemplary implementation in which the timing and sequence of movement of the mobile device 32 are used to control various audio playback operations is now described. More particularly, the controller 35 is configured to play digital audio music files (e.g., MP3, etc.) via an output transducer or a headphone jack, and provide a visual output of the playback status on a display 39. At time $t_1$ (FIG. 3), the mobile device 32 is currently playing a song entitled "Groovin' (On A Sunday Afternoon)" by Fattburger, and 1:27 of the song has already been played. The audio play mode is indicated by the play symbol "▸". The mobile device 32 is then moved from NFC sensor 31a to sensor 31b in a left-to-right sequence (i.e., from point A to point B) and with a relatively long timing (i.e., the mobile device is moved at a relatively "slow" speed from point A to point B, as indicated by the single-wide dashed arrow). The relatively long timing and left-to-right movement sequence results in the controller 35 initiating a "fast forward" operation at time $t_2$ when the NFC sensor 31b is communicated with to move the playback indicator forward through the song, as indicated by the fast forward symbol "▸▸". By way of example, the relatively long timing may be about one second to move from NFC sensor 31a to sensor 31b, although other timing may also be used.

At the illustrated time $t_2$, the current song has been fast-forwarded to a point 2:01 into the song. Normal play operation may be resumed by communicating with a single one of the NFC sensors 31a or 31b, for example. Another option is that the same left-to-right, long timing sequence may be repeated one or more times to speed up the rate of fast forwarding, e.g., to 2×, 3×, etc., fast forward speeds.

At a time $t_3$ (FIG. 4), play of the current song has resumed and has proceeded to a point 3:21 into the song. The mobile device 32 is then moved in a right-to-left sequence from the NFC sensor 31b to the sensor 31a (i.e., from point B to A), again with substantially the same relatively long timing described above. In this case, the opposite operation to that described above occurs, i.e., the controller 32 performs a "rewind" operation to move the playback indicator backwards through the song, as indicated by the rewind symbol "◂◂". Here again, a second movement of the same timing and sequence may be used to increase the rewind rate, as similarly discussed above for the case of a fast forward operation.

Figure 5:
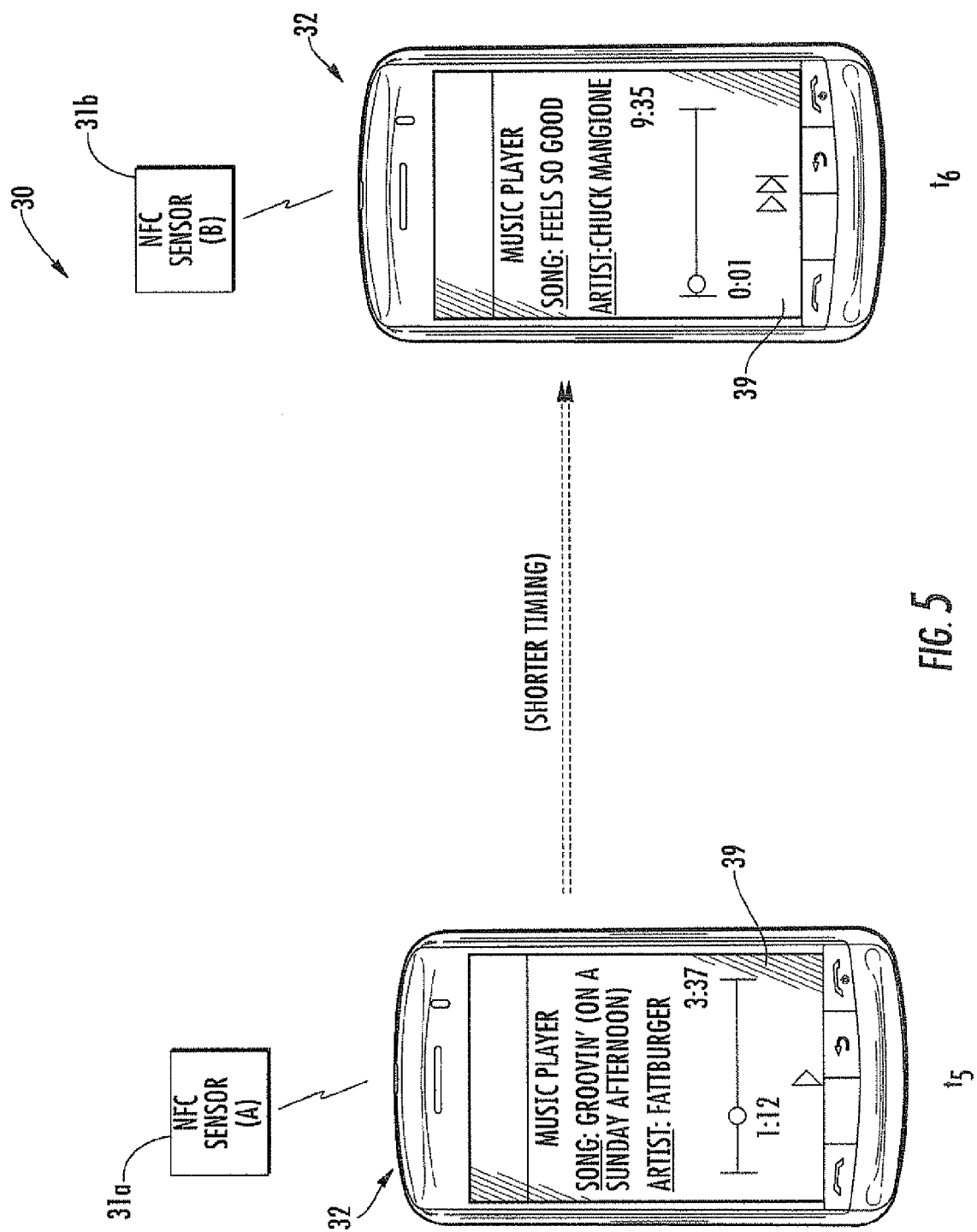
Figure 6:
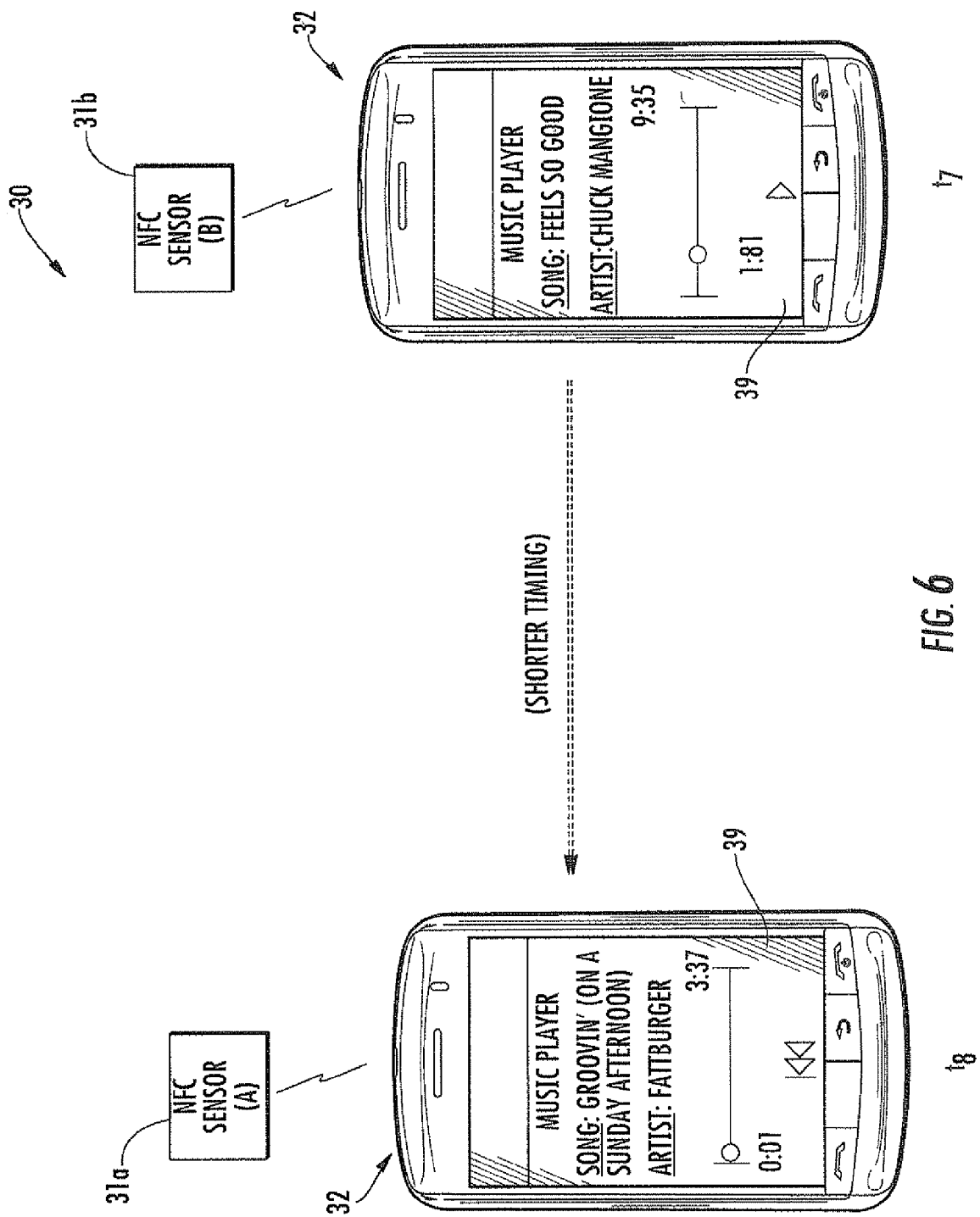

Forward and backward song skipping operations are respectively illustrated in FIGS. 5 and 6. More particularly, at time $t_5$, the controller 35 is again playing the song and it is at a point 1:12 into playback. The mobile device 32 is then moved in the same left-to-right sequence (i.e., from NFC sensor 31a to sensor 31b, or from point A to B) as described with reference to FIG. 3, but now with a shorter timing between moves (i.e., the mobile device is moved at a "faster" pace between the two sensors), as indicated by the double-wide dashed line in FIG. 5. Upon communication with the NFC sensor 31a at time $t_6$, this results in the controller 35 performing a forward skip operation, skipping ahead to a next song (i.e., "Feels So Good" by Chuck Mangione), as indicated by the forward skip symbol "▸▸|". By way of example, the shorter timing may be about 0.5 second, although other timings may also be used. Moreover, it should be noted that the controller 35 may accept a range of timings around the target timing as being valid (e.g., from 0.4 to 0.6 second) for initiating a given movement sequence.

The backward skip operation (FIG. 6) works in the opposite fashion. Namely, the controller 35 is playing the current song ("Feels So Good") and is 1:81 into the song at time $t_6$, at which point the mobile device 32 is moved from the NFC sensor 31b to the sensor 31a (i.e., from right to left, or from point A to point B) at the shorter timing interval (i.e., at the faster pace). This results in a backward or reverse skip operation, as indicated by the backward skip symbol "|◂◂", and skipping to the prior song (i.e., back to "Groovin'").

Figure 7:
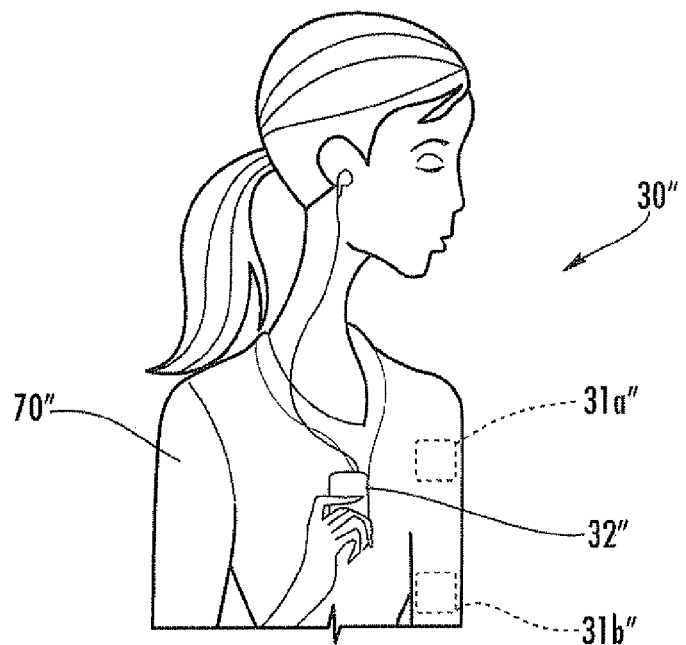
FIG. 7 is a schematic block diagram of another alternative embodiment of the NFC system of FIG. 1.

Referring additionally to FIG. 7, in some embodiments the NFC system 30 may further include a substrate 70" carrying spaced-apart NFC sensors 31a", 31b". More particularly, in this embodiment, the substrate 70" is an article of clothing, namely a shirt. Here, the NFC sensors 31a", 31b" are embedded in a sleeve of the shirt. It will be appreciated that NFC sensors may be carried by other articles of clothing as well, such as belts, jackets, pants, jewelry, etc. In addition, other substrates may also be used. One example includes an exercise machine (e.g., treadmill, elliptical trainer, stair stepper, etc.) to control the various operations of the machine, or equipment associated therewith (i.e., to control a television paired with the exercise machine, such as for volume or channel up or down movement, etc.).

Figure 10:
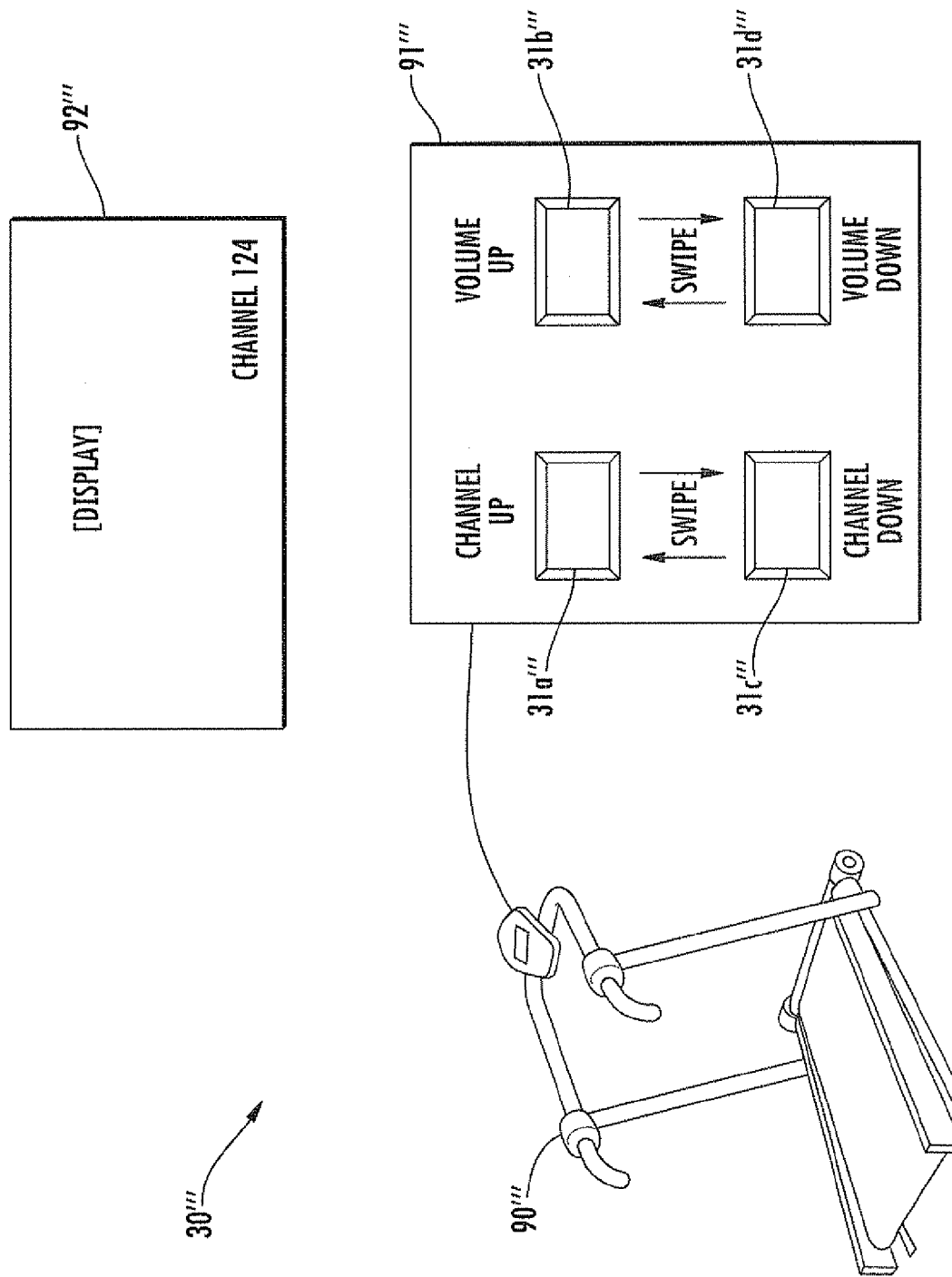
FIG. 10 is a schematic block diagram of still another alternative embodiment of the NFC system of FIG. 1.

An exemplary system 30''' including an exercise machine is shown in FIG. 10. Here, the exercise machine is a treadmill 90''', which includes a control panel 91''' with NFC sensors 31a'''-1b''' arranged in a grid configuration (i.e., in a rectangle, although other shapes may also be used). A display 92''' is associated with the control panel 91''' such that movement of an NFC circuit in up and down directions between NFC sensor pairs 31a''', 31c''' and 31b''', 31d''' respectively causes the channel and volume to go up and down. Thus, a gym key card with an NFC circuit, mobile device with an NFC circuit, etc., may be used to control the channel and volume operations as shown. Further, the timing of the swiping may affect the number of channels to be skipped or the rate at which the volume is changed, for example. The NFC circuit may also be used to identify the respective user or account.

It should be noted that different sensor configurations or grid sizes may be used in different embodiments, such as nine sensors arranged in a nine-button keypad configuration, which may be used to swipe an authentication sequence, a specific channel number, etc. Other examples include three NFC sensors arranged in an "L" configuration (e.g., up/down swiping controls channel changing, left/right swiping controls volume changing, etc.), five NFC sensors arranged in a plus or cross configuration, etc. Also, swiping of the NFC sensors 31a'''-31b''' may be used to control device operations (e.g., audio playback operations, etc.) while exercising in some embodiments.

Various combinations of NFC sensors 31 may be used in different embodiments. For example, in the embodiment shown in FIG. 7, the NFC circuit of the mobile device 32" may be configured as an active NFC reader, while the NFC sensors 31a', 31b' may be configured as passive NFC tags. Thus, for example, when moving the mobile device 32" and up and down the sleeve, the mobile device serves as the active reader and is capable of reading a sequence and timing in which the passive NFC sensor tags 31*a*', 31*b*' are communicated with. This sequence is then translated into the appropriate device function, such as increasing or decreasing audio playback volume, etc., and actions such as tapping one of the passive NFC sensor tags 31*a*', 31*b*' may pause or resume audio playback, for example. Similar functions may be performed with other types of media, such as movies/videos, photos/images, etc. Movement of the mobile device 32" up and down the sleeve could also perform other device functions, such as locking or unlocking the device (e.g., locking/unlocking the screen or keypad), for example.

Referring again to FIG. 2, in other embodiments the NFC circuit 34' of the mobile device 32*a*' may be configured as a passive tag (i.e., operating in low power mode), and the NFC sensors 31*a*'-31*c*' may be configured as active readers. For example, the active NFC sensors 31*a*'-31*c*' may be placed behind a "gesture area" below a public electronic display in an array or matrix, similar to the embodiment described above with reference to FIG. 10 (but located adjacent the display, rather than on the treadmill 90'''). Moving the mobile device 32*a*' across the active NFC sensors 31*a*'-31*c*' would allow multiple active readers in the array to read the passive NFC circuit 34' in a set sequence. The second controller 38' may communicate with each of the active NFC sensors 31*a*'-31*c*' to identify the sequence and timing of the gestures performed by the mobile device 32*a*' (or 32*b*'), and change the display output accordingly. The NFC circuit 34' of the mobile device 32*a*' may advantageously have a unique identification (ID), and may thus identify to the second controller 38' that the mobile device is of a particular brand or model, and brand or model specific interactions may therefore be performed with the display.

The above-noted example of a controllable external display may also be implemented with passive NFC sensors 31*a*'-31*c*'. To change the display, the mobile device 32*a*' may communicate with the second controller 38' via the wireless transceiver 37*a*' (e.g., Bluetooth, WiFi, etc.). This may be advantageous in some applications, however, in that passive NFC tags are generally less expensive than active NFC readers.

Similarly, either active or passive NFC sensors 31*a*'-31*c*' may be used in applications such as the above-described automobile and exercise equipment embodiments. Generally speaking, if the NFC sensors 31*a*'-31*c*' are passive and the NFC circuit 34*a*' is configured as an active reader, if a power savings mode is implemented by the first controller 35*a*' (i.e., to cycle power to the NFC circuit), a potential for missing one or more NFC sensors in the movement sequence is possible depending upon the timing of movement. More particularly, power cycling is sometimes used to lower NFC power requirements by turning the NFC reader on and off in rapid sequence. However, if the NFC sensors 31*a*'-31*c*' are configured as active readers in an "always on" mode, the NFC circuit 34*a*' may be configured as a passive tag with less chance of missing an NFC communication with one of the NFC sensors 31*a*'-31*c*' as the mobile device 32*a*' is gestured past, providing enhanced responsiveness. Additionally, both the NFC circuit 34*a*' and the NFC sensors 31*a*'-31*c*' may be active readers in some embodiments, with or without power cycling.

It should be noted that a same NFC sensor 31' may be scanned more than once during a sequence. More particularly, a number of successive taps and their duration may also be indicative of intent, similar to Morse code, as long as the communication is broken between taps (which requires that the mobile device 32*a*' and NFC sensor 31' go out of range between the taps). Another implementation includes the use of Hall effect sensors and a magnet to keep track of the number of successive "taps" of the mobile device 32*a*'. Additionally, in some embodiments proximity may be determined based upon variations in signal strength (e.g., RSSI (received signal strength indication)) when the mobile device 32*a*' is in motion between two neighboring sensors to increase the resolution of the tracked position.

Exemplary components of a mobile wireless communications device 1000 that may be used in accordance with the above-described embodiments are further described below with reference to FIG. 9. The device 1000 illustratively includes a housing 1200, a keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 9:
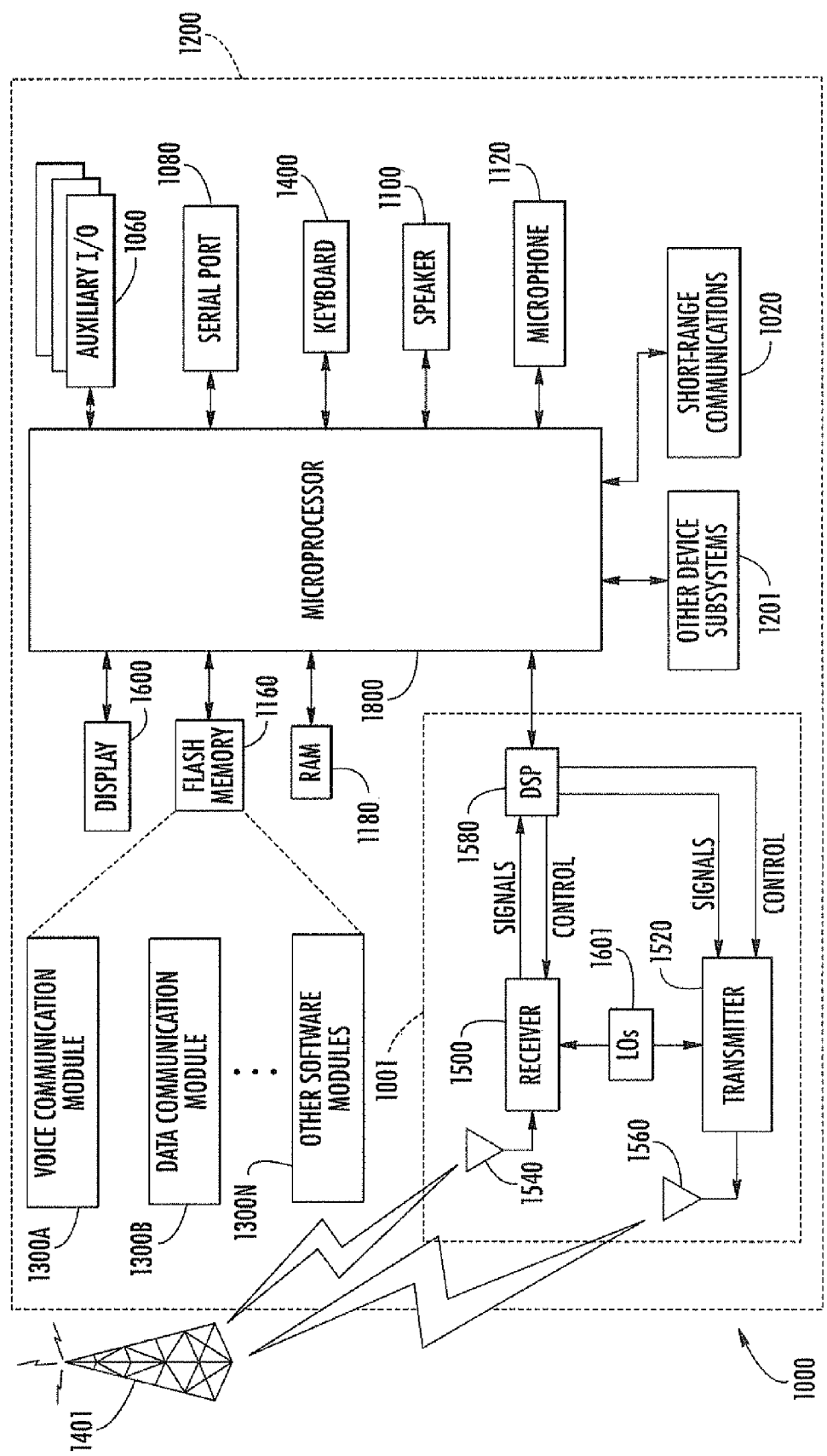
FIG. 9 is a schematic block diagram illustrating exemplary components of a mobile wireless communications device that may be used with the NFC systems of FIGS. 1, 2, and 7.

In addition to the processing device 1800, other parts of the mobile device 1000 are shown schematically in FIG. 9. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TACT™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A near-field communication (NFC) system comprising:
a plurality of spaced-apart NFC sensors; and
at least one mobile wireless communications device comprising
a portable housing,
an NFC circuit carried by said portable housing and configured to establish NEC communications with said NFC sensors when moved in close proximity therewith, and
a first controller carried by said portable housing and coupled to said NFC circuit and configured to perform different mobile device operations based upon a timing and sequence in which said NFC sensors are communicated with.

2. The NFC system of claim 1 wherein the different mobile device operations comprise different media playback operations.

3. The NFC system of claim 2 wherein the different media playback operations comprise different audio playback operations.

4. The NFC system of claim 3 wherein said first controller is configured to move forward and backward through an audio track based upon different communication sequences with said NFC sensors.

5. The NFC system of claim 3 wherein said first controller is configured to skip forward and backward between different audio tracks based upon different communication sequences with said NFC sensors.

6. The. NFC system of claim 2 wherein the different media playback operations comprise controlling different media volume operations.

7. The NFC system of claim 1 wherein the different mobile device operations comprise different mobile device authentication operations.

8. The NFC system of claim 1 wherein said at least one mobile wireless communications device further comprises a wireless transceiver coupled to said first controller; and wherein the different mobile device operations comprise initiating and discontinuing communications via said wireless transceiver.

9. The NFC system of claim 1 further comprising a second controller configured to perform a plurality of different remote operations also based upon the timing and sequence in which said NFC sensors are communicated with.

10. The NFC system of claim 9 wherein the different remote operations comprise different media playback operations.

11. The NFC system of claim 1 further comprising a substrate carrying said plurality of spaced-apart NFC sensors.

12. The NFC system of claim 11 wherein said substrate comprises an article of clothing.

13. The NFC system of claim 1 wherein said at least one mobile wireless communications device comprises a plurality thereof configured to perform the different mobile device operations based upon said portable housings being moved in respective sequences.

14. The NFC system of claim 1 wherein said plurality of spaced-apart NFC sensors are arranged in a grid.

15. A near-field communication (NFC) system comprising:
   a plurality of spaced-apart NFC sensors;
   an NFC circuit configured to establish NFC communications with said NFC sensors when moved in close proximity therewith; and
   a controller coupled to said plurality of spaced-apart NFC sensors and configured to perform a plurality of different remote operations based upon a timing and sequence in which said NFC sensors are communicated with.

16. The NFC system of claim 15 wherein the different remote operations comprise different media playback operations.

17. The NFC system of claim 16 wherein the different media playback operations comprise different audio playback operations.

18. The NFC system of claim 17 wherein said controller is configured to move forward and backward through an audio track based upon different communication sequences with said NFC sensors.

19. The NFC system of claim 17 wherein said controller is configured to skip forward and backward between different audio tracks based upon a different communication sequences with said NFC sensors.

20. The NFC system of claim 16 wherein the different media playback operations comprise controlling different volume operations.

21. The NFC system of claim 15 further comprising a wireless transceiver coupled to said controller;
   and wherein the different remote operations comprise initiating and discontinuing communications via said wireless transceiver.

22. A mobile wireless communications device for use with a plurality of spaced-apart near-field communication (NFC) sensors and comprising:
   a portable housing;
   an NFC circuit carried by said portable housing and configured to establish NFC communications with the NFC sensors when moved in close proximity therewith; and
   a controller carried by said portable housing and coupled to said NFC circuit and configured to perform different mobile device operations based upon a timing and sequence in which said NFC sensors are communicated with.

23. The mobile wireless communications device of claim 22 wherein the different mobile device operations comprise different media playback operations.

24. The mobile wireless communications device of claim 22 wherein the different mobile device operations comprise different mobile device authentication operations.

25. A near-field communication (NFC) method for a mobile wireless communications device comprising a portable housing and an NFC circuit carried by the portable housing, the method comprising:
   establishing NFC communications between the NFC circuit and a plurality of spaced apart NFC sensors when the NFC circuit is moved in close proximity with the NFC sensors; and
   performing different mobile device operations based upon a timing and sequence in which the NFC sensors are communicated with.

26. The method of claim 25 wherein the different mobile device operations comprise different media playback operations.

27. The method of claim 26 wherein the different media playback operations comprise different audio playback operations.

28. The method of claim 27 wherein the different audio playback operations comprise moving forward and backward through an audio track based upon different communication sequences with said NFC sensors.

29. The method of claim 27 wherein the different audio playback operations comprise skipping forward and backward between different audio tracks based upon different communication sequences with said NFC sensors.

30. The method of claim 26 wherein the different media playback operations comprise controlling different media volume operations.

31. The method of claim 25 wherein the different mobile device operations comprise different mobile device authentication operations.

* * * * *

UNITED STATES PATENT AND TRADEMARK OFFICE
CERTIFICATE OF CORRECTION

| | | |
|---|---|---|
| PATENT NO. | : 8,670,709 B2 | Page 1 of 2 |
| APPLICATION NO. | : 12/713628 | |
| DATED | : March 11, 2014 | |
| INVENTOR(S) | : Griffin et al. | |

It is certified that error appears in the above-identified patent and that said Letters Patent is hereby corrected as shown below:

In the Claims

Column 11, Line 1  Delete: "NEC"
         Insert: --NFC--

Column 11, Lines 2-3 Delete: "operations,"
         Insert: --operations.--

Column 11, Line 12  Delete: "NEC"
         Insert: --NFC--

Column 11, Line 14  Delete: "NEC"
         Insert: --NFC--

Column 11, Line 33  Delete: "NEC"
         Insert: --NFC--

Column 11, Line 35  Delete: "upon a different"
         Insert: --upon different--

Column 11, Line 36  Delete: "NEC"
         Insert: --NFC--

Column 11, Line 37  Delete: "NEC"
         Insert: --NFC--

Column 11, Line 40  Delete: "NEC"
         Insert: --NFC--

Signed and Sealed this
Eighth Day of July, 2014

Michelle K. Lee
*Deputy Director of the United States Patent and Trademark Office*

CERTIFICATE OF CORRECTION (continued)
U.S. Pat. No. 8,670,709 B2

Column 11, Line 46    Delete: "NEC"
                                             Insert: --NFC--

Column 11, Line 49    Delete: "NEC"
                                             Insert: --NFC--

Column 11, Line 50    Delete: "NEC"
                                             Insert: --NFC--

Column 12, Line 2      Delete: "NEC"
                                             Insert: --NFC--